US009122076B2

(12) United States Patent
Castillo

(10) Patent No.: US 9,122,076 B2
(45) Date of Patent: Sep. 1, 2015

(54) REDUCED PROFILE GLASSES

(76) Inventor: Ludwig Orozco Castillo, Brandon, MS (US)

(*) Notice: Subject to any disclaimer, the term of this patent is extended or adjusted under 35 U.S.C. 154(b) by 174 days.

(21) Appl. No.: 13/549,458

(22) Filed: Jul. 14, 2012

(65) Prior Publication Data
US 2014/0016082 A1  Jan. 16, 2014

(51) Int. Cl.
G02C 5/06 (2006.01)
G02C 5/22 (2006.01)
G02C 5/00 (2006.01)

(52) U.S. Cl.
CPC G02C 5/06 (2013.01); G02C 5/006 (2013.01); G02C 5/2254 (2013.01); G02C 2200/06 (2013.01)

(58) Field of Classification Search
CPC .......... G02C 5/006; G02C 5/008; G02C 5/02; G02C 5/04; G02C 5/06; G02C 5/08; G02C 2200/06; G02C 2200/16; G02C 2200/04
USPC .......... 351/41, 63, 68, 83, 124, 126, 133, 153
See application file for complete search history.

(56) References Cited

U.S. PATENT DOCUMENTS

| 4,720,186 A * | 1/1988 | Douillard ........................ 351/63 |
| 5,448,317 A | 9/1995 | Huang |
| 5,532,766 A * | 7/1996 | Mateer et al. .................. 351/63 |
| 5,642,177 A | 6/1997 | Nishioka |
| 5,896,185 A | 4/1999 | Huang |
| 6,076,926 A | 6/2000 | Kostka |
| 6,158,860 A | 12/2000 | Huang |
| 6,641,260 B1 * | 11/2003 | Avital ............................. 351/41 |
| 6,752,496 B2 * | 6/2004 | Conner .......................... 351/63 |
| 7,070,273 B2 | 7/2006 | Benavides et al. |
| 7,165,838 B1 | 1/2007 | Sapp |
| 2010/0073626 A1 | 3/2010 | Engstrom |
| 2011/0037939 A1 | 2/2011 | Pulvino et al. |
| 2011/0228210 A1 | 9/2011 | Willett |

FOREIGN PATENT DOCUMENTS

WO   WO 2009/077846   *  6/2009  ...................... 351/63

* cited by examiner

Primary Examiner — Huy K Mai

(57) ABSTRACT

A pair of reduced profile wrap-around glasses (100) including a pair of lenses (102), a pair of support arms (112), and a pair of frames including a right frame (104a) and a left frame (104b) forming at least one locking hinge (106) at the nose bridge. The locking hinge is manually operable to pivotally hinge the pair of frames between two states: wrap-around wearable and reduced profile. The locking hinge comprises a central axle (114) and one ledge (110) formed on the medial side of one of the right frame and the left frame, a front slit (108a) and a back slit (108b) formed on the medial side of the other one of the right frame and the left frame, wherein said ledge pivotally engage with said front slit in the wrap-around wearable state and pivotally engage with said back slit in the reduced profile state. In an alternative embodiment, the locking hinge may comprise one slit and two ledges. In another alternative embodiment, the pair of frames may form two locking hinges at the nose bridge with two central axles.

15 Claims, 11 Drawing Sheets

REDUCED PROFILE GLASSES

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears' in the Patent and Trademark Office, patent file or records, but otherwise reserves all copyright rights whatsoever.

FIELD OF THE INVENTION

One or more embodiments of the invention generally relate to eye glasses. More particularly, one or more embodiments of the invention relate to foldable eye glasses.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that glasses, also known as eyeglasses or spectacles, are frames bearing lenses worn in front of the eyes. A pair of support arms that rest on the ears, typically support the glasses. Glasses are normally used for vision correction or eye protection. Safety glasses are a kind of eye protection against flying debris or against visible and near visible light or radiation. Sunglasses allow better vision in bright daylight, and may protect the eyes from high levels of ultraviolet light.

Typically, glasses may be stowed by folding them. This creates a double thickness, but reduces the overall area of the glasses. Detachable components of the glasses may provide more stowability also.

In view of the foregoing, it is clear that these traditional techniques are not perfect and leave room for more optimal approaches.

SUMMARY OF THE INVENTION

The objective of the present invention is that of reducing the bulk of wrap-around glasses to facilitate stowing them in narrow spaces and loose compartments such as clothing pockets (shirts, suites, labcoats, pants, etc), briefcases, purses, waist packs etc., while maintaining their protective and aerodynamic curvature when in use.

According to the goal of the invention, the objective is attained by two separate frames that join, at the nose bridge, forming a central locking hinge that manually pivots and locks the wrap-around glasses between two configurations: wrap-around and reduced profile; such central locking hinge being manufactured in a simple economical manner as part of the medial aspect of the frames, and simultaneously being provided with a strong resistant structure lasting several pivoting and locking cycles.

Such central locking hinge moves between the two aforementioned configurations by pivoting on a central axle or pin, and it locks in either configuration by the engagement of one or two ledges to two or one slits located in the medial aspect of the opposing frames.

According to another aspect the invention also provided is a process for manufacturing and assembling the reduced profile wrap-around glasses.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1a shows a front view thereof, FIG. 1b illustrates a top view of the low profile glasses in an exemplary wrap-around wearable state, and FIG. 1c illustrates the glasses shown in FIG. 1b in an exemplary low profile state.

FIG. 2a shows a front view thereof, FIG. 2b illustrates a top view of the low profile glasses in an exemplary low profile state, and FIG. 2c illustrates the glasses shown in FIG. 2b in an exemplary wrap-around state;

Figure 1A:
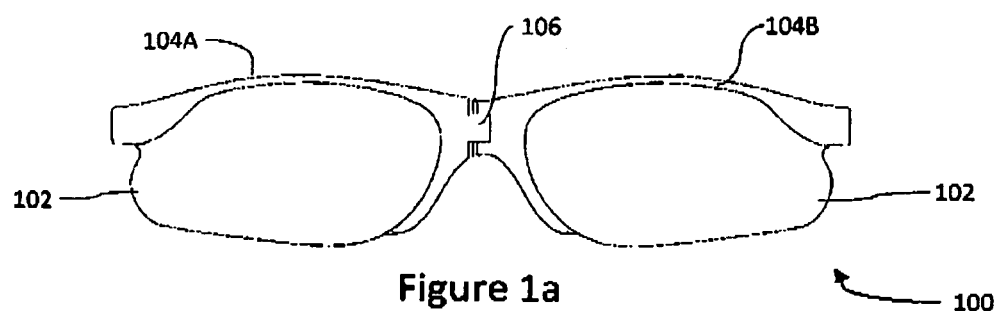
FIGS. 1a, 1b, 1c illustrate various views of an exemplary low profile glasses with one central locking hinge at the nose bridge, according to an embodiment of the present invention, where

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include substeps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings.

Figure 1B:
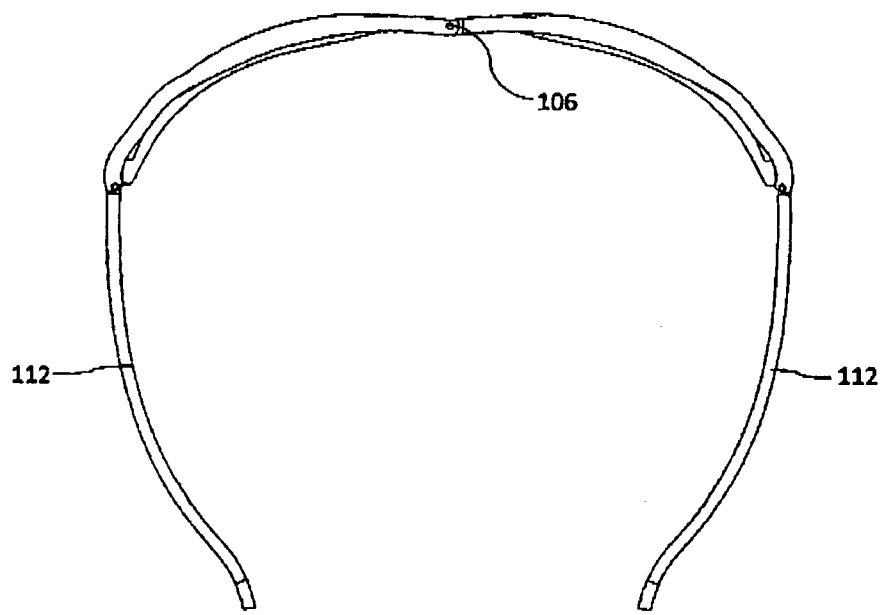
Figure 1C:
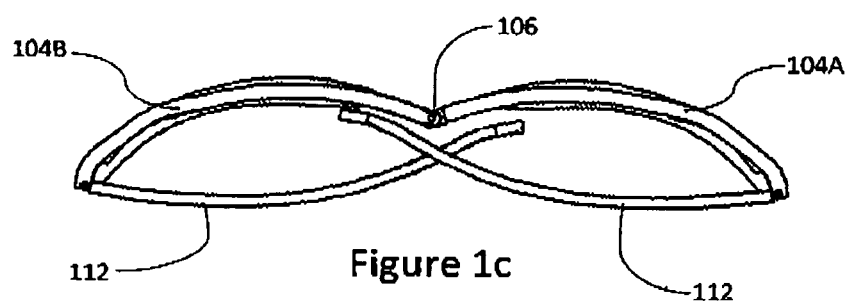
Figure 3A:
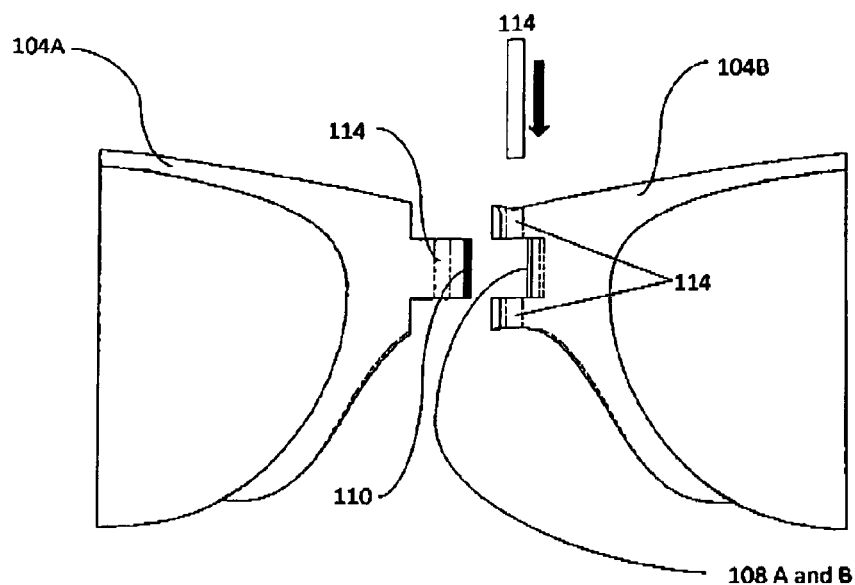
FIG. 3a illustrates a front view of how to assemble a single hinge reduced profile glasses with two frames joining in the middle using a central axle or pin.
Figure 3B:
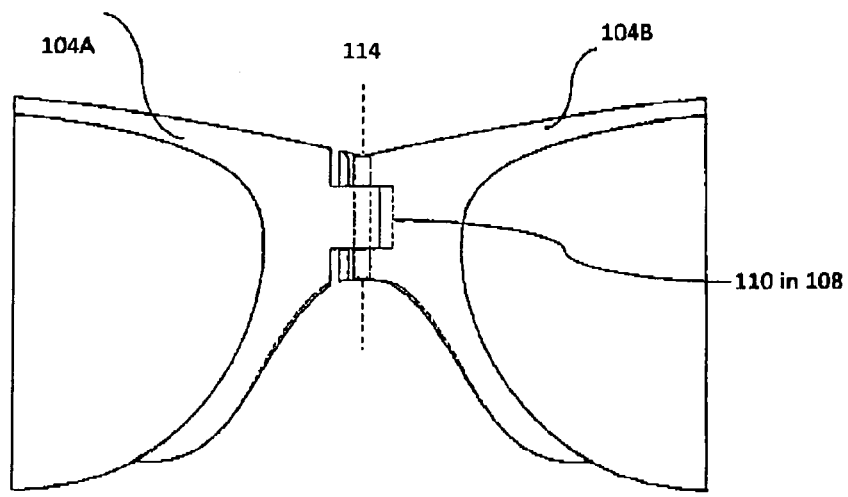
FIG. 3b shows a front view of an assembled single hinge reduced profile glasses, according to an embodiment of the present invention.

FIGS. 1a, 1b, 1c, 3a and 3b illustrate various views of an exemplary embodiment of a pair of reduced profile wrap-around glasses 100 with one central locking hinge 106 at the nose bridge, in accordance with at least one embodiment of the present invention, where FIG. 1a shows a front view thereof, FIG. 1 b illustrates a top view of the low profile glasses in an exemplary wrap-around wearable state, FIG. 1c illustrates the glasses shown in FIG. 1b in an exemplary low profile state, FIG. 3a illustrates a front view of how to assemble the reduced profile glasses with two frames joining in the middle using a central axle or pin 114, and FIG. 3b shows a front view of the assembled reduced profile glasses. The reduced profile glasses may not fold or detach, thereby eliminating doubling the thickness. Rather, the reduced profile glasses include a pair of lenses 102 and a pair of frames 104 that join forming at least one locking hinge at the nose bridge 106. The locking hinge pivots at a limited angle so that the glasses may compact into a lower profile by bending inwardly and abutting against a pair of support arms 112. When in a low profile state, the reduced profile glasses may store inside limited spaces such as, without limitation, front pockets, suits, labcoats, purses, briefcases, waist packs, and narrow compartments when compacted into the low profile state. When in the wrap-around wearable state, the reduced profile glasses may provide a snug, aerodynamic fit for protection and reduced wind resistance.

Figure 2A:
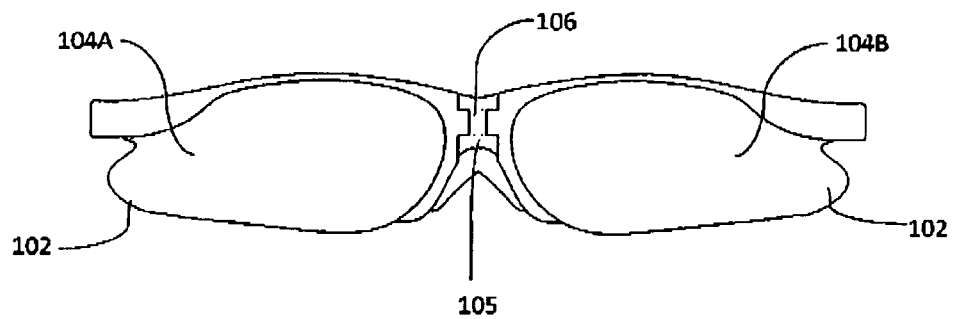
FIGS. 2a, 2b, and 2c illustrate various views of an exemplary low profile glasses with two central locking hinges at the nose bridge, according to an embodiment of the present invention, where
Figure 2B:
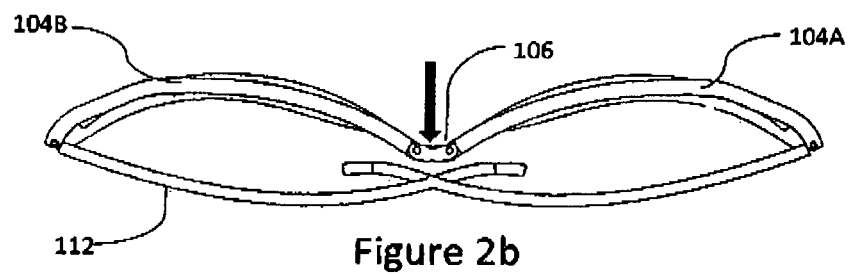
Figure 2C:
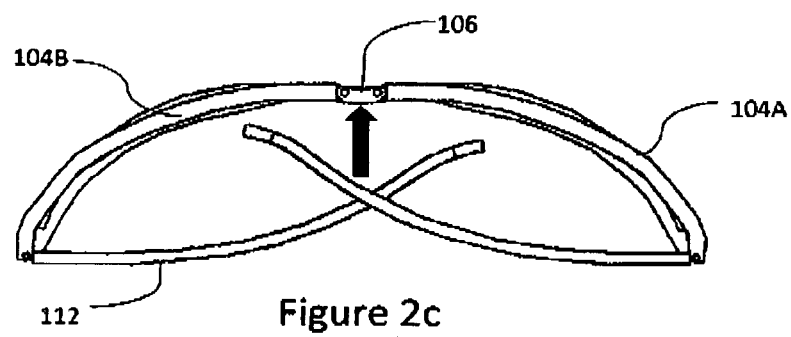
Figure 4A:
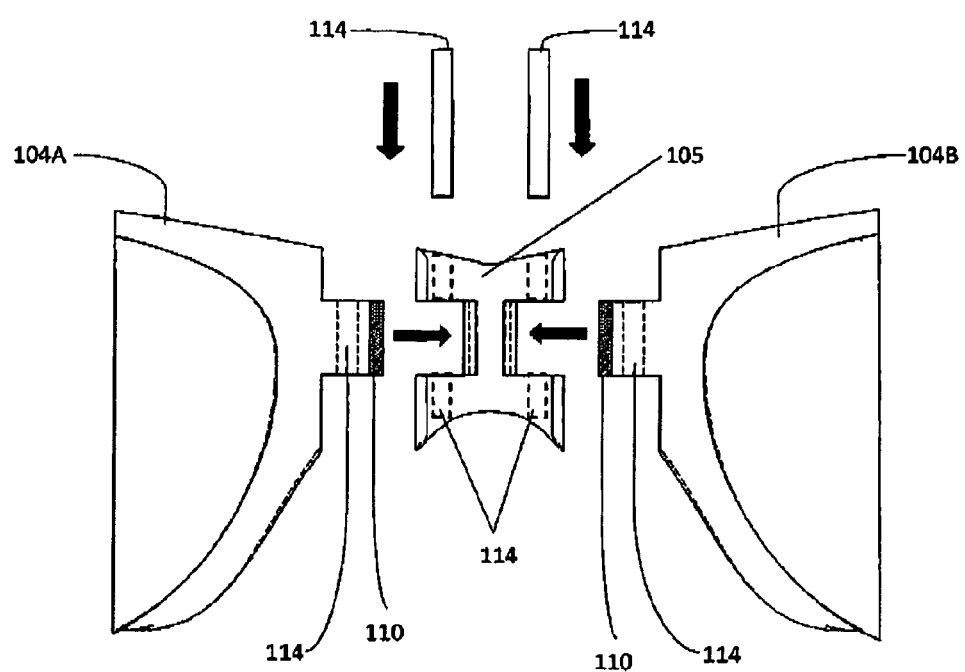
FIG. 4a illustrates a front view of how to assemble a double hinge reduced profile glasses with two frames joining in the middle using two central axles or pins and a frame medial portion.
Figure 4B:
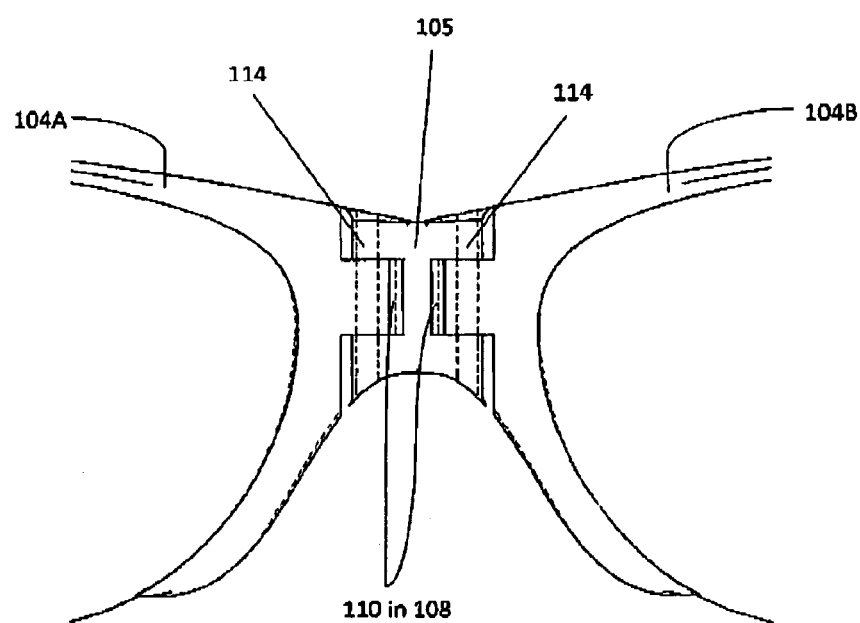
FIG. 4b shows a front view of an assembled double hinge reduced profile glasses, according to an embodiment of the present invention.
Figure 4C:
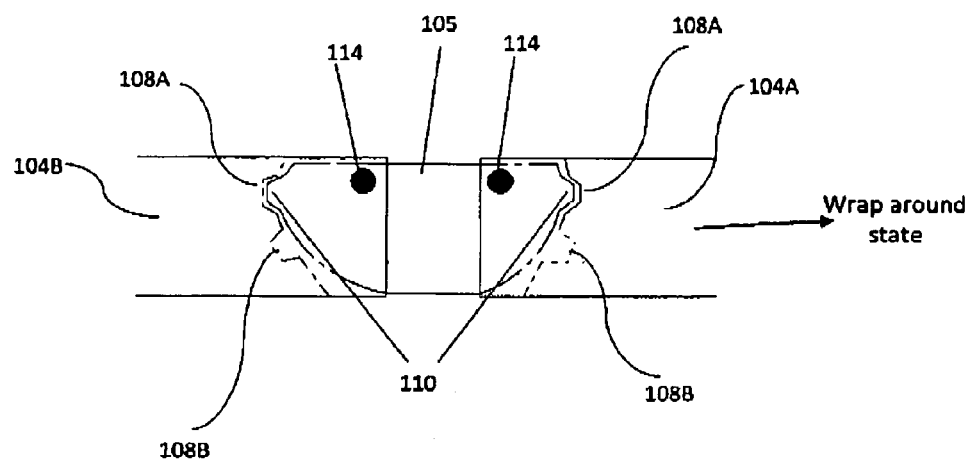
FIGS. 4c and 4d illustrate a top view of a double hinge reduced profile glasses with four exemplary slits receiving two ledges for locking the reduced profile glasses into a position, according to an embodiment of the present invention.
Figure 4D:
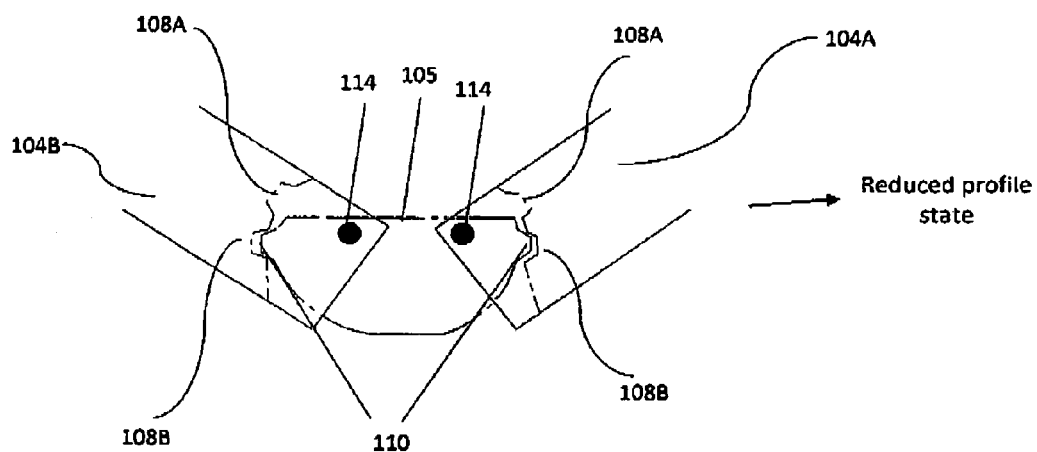

FIGS. 2a, 2b, 2c, 4a and 4b illustrate various views of an exemplary embodiment of a pair of reduced profile glasses 100 with two central locking hinges 106 at the nose bridge, according to an embodiment of the present invention, where FIG. 2a shows a front view thereof, FIG. 2b illustrates a top view of the low profile glasses in an exemplary low profile state, FIG. 2c illustrates the glasses shown in FIG. 2b in an exemplary wrap-around state, FIG. 4a illustrates a front view of how to assemble the reduced profile glasses with two frames joining in the middle using two central axles or pins 114 and a frame medial portion 105, and FIG. 4b illustrates a front view of the assembled reduced profile glasses. The pair of reduced profile glasses may include a pair of separate non-folding, multi-curved frames, with each frame carrying a separate lens, in accordance with an embodiment of the present invention. The pairs of frames 104 and pair of lenses 102 are interconnected at the nose bridge by the locking hinge 106. The reduced profile glasses may not attain complete flattness. However, while in the stowable, low profile state, the frames may still retain some convexical curvature along the lenses.

Those skilled in the art will appreciate that the curvature in the frames is not a space consuming feature, and may be efficacious for protection, styling and aerodynamic design purposes.

In yet another exemplary embodiment, pair of reduced profile glasses include a pair of separate non-folding, multi-curved frames, with each frame carrying a separate lens, in accordance with an embodiment of the present invention. The pair of frames are joined at the nose bridge by at least one locking hinge 106. The locking hinge's central axle or axles 114 secure inside a fitting holes portion, located between the pair of frames. The locking hinge may pivot to orient the reduced profile glasses into a low profile state. Suitable ranges for the pivoting include but are not limited to 20 to 40 degrees. However greater or lesser degrees of pivot are possible. The 20 to 40 degree pivot moves the glasses into one of the at least two positions. The locking hinge comprises of 1 or 2 slits 108. The slits are configured to receive 1 or 2 ledges 110 that extend from the medial side of the frames 104. Some examples of the slits receiving the ledges are illustrated by way of example in FIGS. 3c, 3d, 3e, 5a, 5b and 5c, in accordance to an embodiment of the present invention.

Figure 5A:
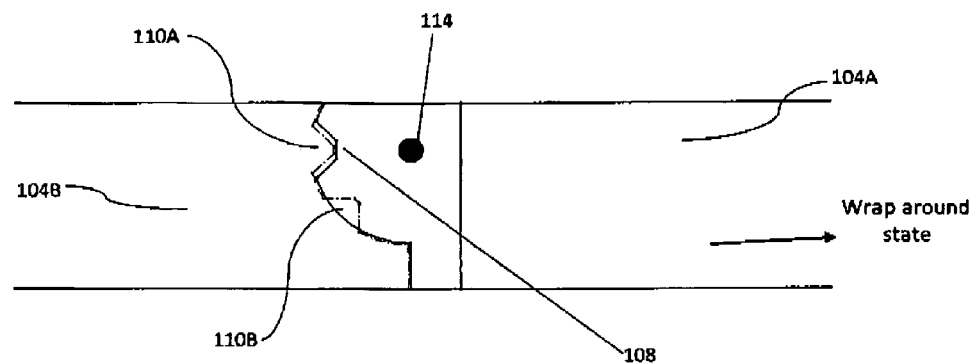
FIGS. 5a and 5b illustrate a top view and FIG. 5c illustrates an inside view of a single hinge reduced profile glasses with a single slit receiving two exemplary ledges for locking the low profile glasses into a position, according to an embodiment of the present invention.
Figure 5B:
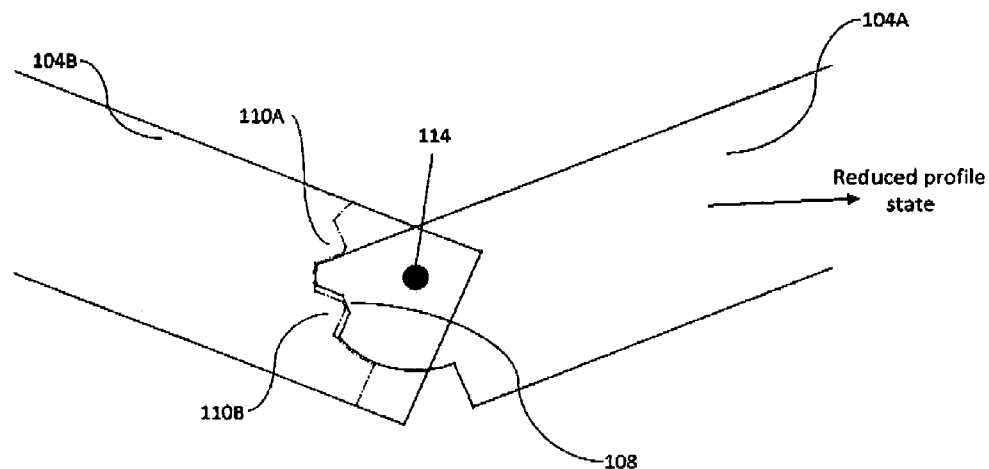
Figure 5C:
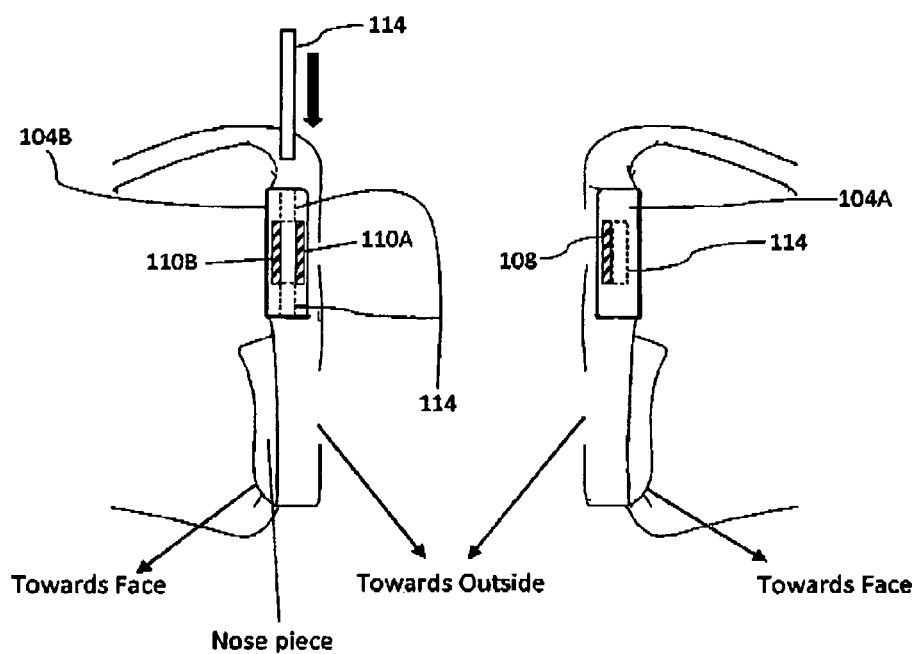

For example, but not limited to, 1 ledge may engage 2 slits (FIGS. 3c, 3d and 3e), or 2 ledges may share 1 slit (FIGS. 5a, 5b and 5c). The engagement between the ledges and the slits may create a locked position that secures the glasses between one of two states —a wrap-around wearable state and a low profile state.

In yet another embodiment, pair of frames counters the upper portions of the lenses, in accordance with an embodiment of the present invention. In one exemplary embodiment, the frames may comprise, without limitation, a light, thin thermoplastic composite, typically ABS, polyacrylate, nylon or similar material that has flexible properties. The pair of support arms may be curved for providing a snug, aerodynamic fit. Suitable fabrication materials for the pair of frames and the pair of support arms may include, without limitation, polyacrylate, plastic synthetics, rubber, silicone, fiberglass, metal alloy, and latex.

In yet another embodiment, the wrap-around wearable state may be achieved by extending the pair of support arms outwardly and manually bending the locking hinge away from the pair of support arms. A clicking movement may occur between the alternate positions as a result of the engagement between the slits and the ledges. The pair of frames may then form a curvature that may be operable for contouring the glasses in an aerodynamic manner. In a further embodiment, a low profile, stowable state is created by retracting the pair of support arms and manually positioning the locking hinge into a face-to-face abuttment with the pair of support arms.

An example of pair of lenses that provide both functional and stylistic requirements while still contributing to the compaction of the reduced profile wrap-around glasses interactive comparison process is illustrated by way of example in FIGS. 1a, 1b, 1c, 2a, 2b, and 2c. The lenses in the reduced profile wrap-around glasses may be curved sufficiently to contour into a protective, stylish, aerodynamic fit in accordance with the frames. In one alternative embodiment, the pair of lenses may be configured for multiple functions including, without limitation, sun protection, light reduction, prescription, exterior shields, x-ray protection, reading magnification, scientific magnifying capacity, sporting, shooting range protection, fashion, prescription, and the like. In one alternative embodiment, the lenses may incorporate bifocals, loops, and prescription lenses. Those skilled in the art will readily recognize, in light of and in accordance with the teachings of the present invention, that the lenses may be utilized for protection, such as, without limitation, clear safety glasses/goggles for use in laboratories, shops, operating rooms, shooting range, and the like. In yet another embodiment, both lenses may be planar, rather than curved, for further reducing the profile. However, the planar configuration may deduct from the protective, aerodynamic and fashion functionality of reduced profile glasses.

In one exemplary embodiment, lenses may have a thickness range including, without limit, 2.9 mm to 11.1 mm for glass lenses and 3.5 to 14.8 mm for plastic lenses. However, greater or lesser thicknesses may be possible. Lenses may also comprise of a refractive index as high, but not limited to, 1.9 for glass lenses, and as high as 1.74 for plastic lenses.

In one exemplary embodiment, locking hinge may include a locking bilateral hinge, at the nose bridge, that secures pair of glasses into the low profile position, in accordance with an embodiment of the present invention (FIGS. 2a, 2b, 2c, 4a and 4b). In one alternative embodiment, the locking hinge may pivot in two directions. In a yet another embodiment, there may be two locking hinges adjacently positioned that interconnect the frames and the lenses (FIGS. 2a, 2b, 2c, 4a and 4b). The two locking hinges may then be joined, without limitation, by two central axels, adhesive, pins, or fasteners. In an alternative embodiment, only one locking hinge rests medially at the nose bridge (FIGS. 1a, 1b, 1c, 3a and 3b). The locking hinge may pivot at a range of 20 to 40 degrees. However greater or lesser ranges of pivoting may exist. The 20 to 40 degree pivot is efficacious for preventing the glasses from completely folding, and thereby increasing the thickness. The limited pivot allows the glasses to position into the low profile position, and no more. Suitable fabrication materials for the locking hinge may include, without limitation, polyacrylate, plastic synthetic, rubber, silicone, fiberglass, metal alloy, and latex.

In the present embodiment, pair of frames countering the upper portions of the lenses, in accordance with an embodiment of the present invention. In one exemplary embodiment, the frames may comprise, without limitation, a light, thin plastic composite, a polyacrylate, or similar material that has flexible properties. Pair of support arms may be curved for providing a snug, aerodynamic fit. Suitable fabrication materials for the pair of frames and the pair of support arms may include, without limitation, polyacrylate, plastic synthetics, rubber, silicone, fiberglass, metal alloy, and latex.

Figure 3C:
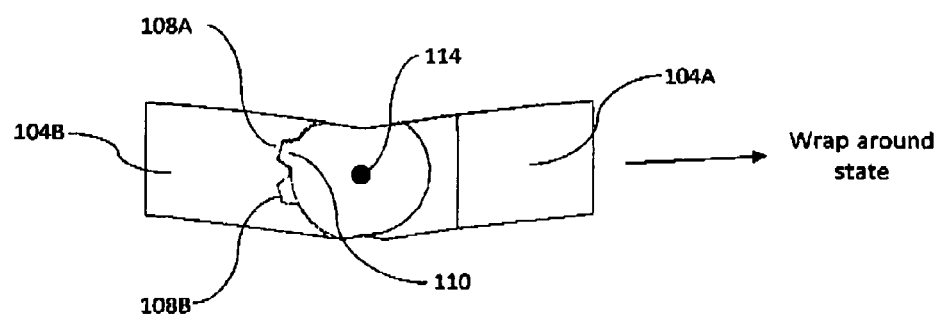
FIGS. 3c and 3d illustrate a top view and FIG. 3e illustrates an inside view of a single hinge reduced profile glasses with two exemplary slits receiving a single ledge for locking the reduced profile glasses into a position, according to an embodiment of the present invention.
Figure 3D:
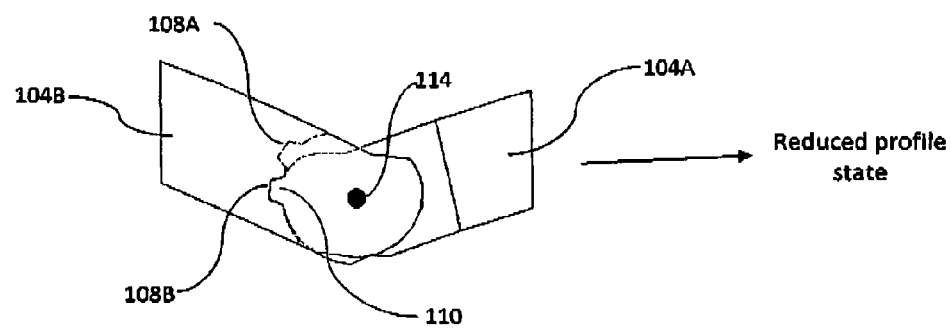
Figure 3E:
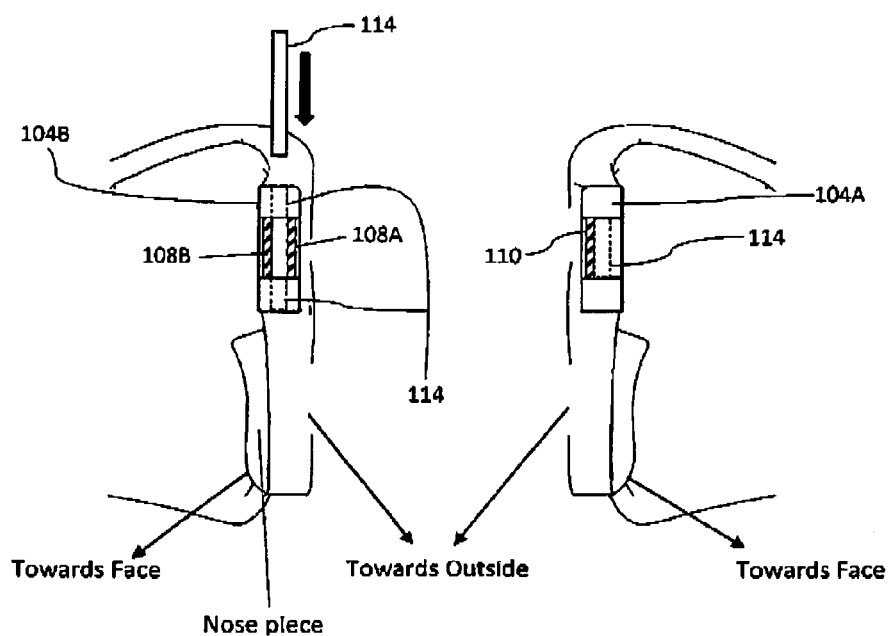

FIGS. 3c and 3d illustrate a top view and FIG. 3e illustrates an inside view of an exemplary locking hinge with one ledge 110 formed on the medial side of the right frame 104a, and two slits 108 formed on the medial side of the left frame 104b, in accordance with an embodiment of the present invention. The front slit 108a is configured to receive the ledge locking the reduced profile glasses into the wrap-around wearable state. The back slit 108b is configured to receive the ledge locking the reduced profile glasses into the low profile state.

FIGS. 5a and 5b illustrate a top view and FIG. 5c illustrates an inside view of an exemplary locking hinge with one slit 108 formed on the medial side of the right frame 104a, and two ledges 110 formed on the medial side of the left frame 104b, in accordance with an embodiment of the present invention. The front ledge 110a is configured to receive the slit locking the reduced profile glasses into the wrap-around wearable state. The back ledge 110b is configured to receive the slit locking the reduced profile glasses into the low profile state. Ledges may comprise of a more rigid material to withstand the continuous in and out engagement with the slits.

Those skilled in the art will readily recognize, in light of and in accordance with the teachings of the present invention, that there may be additional components for locking the glasses into the two positions, including, but not limited to, a pin and hole, a geared wheel with rubber stopper, and 3 or more slits and ledges. The chief function is to securely lock the glass into the low profile position for secure stowing.

In one alternative embodiment, reduced profile glasses compact into a lower profile through the utilization of enhanced flexibility and a composition of a nanomaterial. Pair of frames may be fully bendable to the extent that absolute flatness is achieved. The pair of lenses may include, without limitation, a plastic/synthetic glass that will curve and flatten completely without damaging the integrity of the lenses. The clear plastic glass composition, from which the lenses are comprised, may assume at least two configurations and retain these at least two forms multiple times. The pair of support arms in this embodiment may comprise an articulated coating arm, comprising, without limitations, natural rubber and latex for optimal flexibility. The frames may also comprise a combination of small metal pieces, cable and or plastic/rubber for greater flexibility. Those skilled in the art, in light of the present teachings will appreciate that nanomaterial composition, curing methods, and aerodynamic styling now known or later developed may create greater flexibility and storability for all components in the reduced profile glasses.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing a pair of glasses that pivotally hinge into a low profile stowable position without completely folding, according to the present invention will be apparent to those skilled in the art. Various aspects of the invention have been described above by way of illustration, and the specific embodiments disclosed are not intended to limit the invention to the particular forms disclosed. The particular implementation of the hinged compacting of the reduced profile glasses may vary depending upon the particular context or application. By way of example, and not limitation, the hinged compacting of the reduced profile glasses described in the foregoing were principally directed to a limited pivot that creates a low profile glass without fully folding. However, similar techniques may instead be applied to a laptop computer or a suitcase which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A pair of reduced profile wrap-around glasses (100) comprising:
a pair of lenses (102);
a pair of frames including a right frame (104a) and a left frame (104b), said pair of frames forming a wrap-around configuration for holding said pair of lenses in front of the user's eyes, said pair of frames forming one locking hinge (106) at the nose bridge, said one locking hinge being manually operable to pivotally hinge the pair of frames between two states: wrap-around wearable and reduced profile; said one locking hinge comprising one central axle (114) and one ledge (110) formed on the medial side of one of the right frame and the left frame, a front slit (108a) and a back slit (108b) formed on the medial side of the other one of the right frame and the left frame, wherein said ledge pivotally engage with said front slit in the wrap around wearable state and pivotally engage with said back slit in the reduced profile state, a pair of support arms (112), said pair of support arms being operable to open when in use, and fold when stow.

2. A pair of reduced profile wrap-around glasses comprising:
a pair of lenses (102);
a frame medial portion (105);
a pair of frames including a right frame (104a) and a left frame (104b), said pair of frames forming a wrap-around configuration for holding said pair of lenses in front of the user's eyes, said pair of frames connected to the frame medial portion (105), forming one or more locking hinges (106) at the nose bridge, said locking hinges being manually operable to pivotally hinge the pair of frames between two states: wrap-around wearable and reduced profile; said locking hinges each comprising a central axle (114) and a ledge (110) formed on the right and the left side of the frame medial portion (105), two front slits (108a) and two back slits (108b) formed on the medial side of the right frame and the left frame, wherein said ledges pivotally engage with corresponding front slits in the wrap around wearable state and pivotally engage with corresponding back slits in the reduced profile state.

3. The pair of reduced profile wrap-around glasses of claim 2, comprising:
one or more locking hinges (106) at the nose bridge, each locking hinge (106) being manually operable to pivotally hinge the pair of frames between two states: wrap-around wearable and reduced profile; each locking hinge comprising one central axle (114) and one slit (108) formed on the medial side of one of the right frame and the left frame, a front ledge (110a) and a back ledge (110b) formed on the medial side of the other one of the right frame and the left frame, wherein each slit pivotally engages with its corresponding front ledge in the wrap around wearable state and pivotally engages with its corresponding back ledge in the reduced profile state.

4. The pair of reduced profile wrap-around glasses of claim 3, wherein said pair of reduced profile glasses is manually operable to flatten and lock into a reduced profile position.

5. The pair of reduced profile wrap-around glasses of claim 4, wherein said at least one locking hinge (106) is manually operable to hinge on at least one central axle (114) about twenty to forty degrees for configuring into said reduced profile state.

6. The pair of reduced profile wrap-around glasses of claim 5, wherein said at least one locking hinge (106) at the nose bridge is manually operable to hinge on at least one central axle (114) in two directions: forward or backward.

7. The pair of reduced profile wrap-around glasses of claim 2, wherein at least one ledge (110) locks inside a corresponding front slit (108a) for configuring said pair of reduced profile glasses into a wrap-around wearable state, and wherein said ledge locks inside a corresponding back slit (108b) for configuring said pair of reduced profile glasses into said reduced profile state.

8. The pair of reduced profile wrap-around glasses of claim 2, wherein at least one slit (108) locks into a corresponding front ledge (110a) for configuring said pair of reduced profile glasses into a wrap-around wearable state, and wherein said slit locks into a corresponding back ledge (110b) for configuring said pair of reduced profile glasses into said reduced profile state.

9. The pair of reduced profile wrap-around glasses of claim 8, in which said-at least one locking hinge (106) comprises one locking hinge.

10. The pair of reduced profile wrap-around glasses of claim 9, in which said at least one locking hinge (106) comprises two locking hinges.

11. The pair of reduced profile wrap-around glasses of claim 10, wherein said pair of support arms (112) is operable to pivotally hinge into said open wearable position for providing support to said pair of reduced profile glasses.

12. The pair of reduced profile wrap-around glasses of claim 11, wherein said pair of support arms (112) is operable to pivotally hinge into said closed position for stowing said pair of reduced profile glasses.

13. The pair of reduced profile wrap-around glasses of claim 12, wherein said pair of lenses (102) are configured to be transparent.

14. The pair of reduced profile wrap-around glasses of claim 13, wherein said pair of lenses (102) are operable to magnify.

15. The pair of reduced profile wrap-around glasses of claim 14, wherein said pair of lenses (102) are fabricated from lead for blocking electromagnetic radiation.

\* \* \* \* \*